(12) United States Patent
Wakisaka

(10) Patent No.: US 7,187,501 B2
(45) Date of Patent: Mar. 6, 2007

(54) RESIN LENS ARRAY AND OPTICAL WRITING HEAD

(75) Inventor: Masahide Wakisaka, Osaka (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 374 days.

(21) Appl. No.: 10/488,023

(22) PCT Filed: Sep. 24, 2002

(86) PCT No.: PCT/JP02/09749

§ 371 (c)(1),
(2), (4) Date: Feb. 27, 2004

(87) PCT Pub. No.: WO03/029011

PCT Pub. Date: Apr. 10, 2003

(65) Prior Publication Data

US 2005/0001896 A1    Jan. 6, 2005

(30) Foreign Application Priority Data

Sep. 28, 2001  (JP)  ............................. 2001-299883
Mar. 19, 2002  (JP)  ............................. 2002-076301

(51) Int. Cl.
  *G02B 27/10* (2006.01)
  *G02B 7/02* (2006.01)
(52) U.S. Cl. ...................... 359/622; 359/811
(58) Field of Classification Search ................ 359/620, 359/621, 622, 626, 806, 811
See application file for complete search history.

(56) References Cited

U.S. PATENT DOCUMENTS 5,403,102 A    4/1995  Yokoyama 6,545,811 B1 *  4/2003  Fujimoto .................... 359/619

FOREIGN PATENT DOCUMENTS

| JP | 01-122463 | 5/1989 |
|----|-----------|--------|
| JP | 01-238962 | 9/1989 |
| JP | 05-088518 | 4/1993 |
| JP | 07-195731 | 8/1995 |

(Continued)

OTHER PUBLICATIONS

International Search Report dated Dec. 17, 2002, application No. PCT/JP02/09749.

*Primary Examiner*—David N. Spector
(74) *Attorney, Agent, or Firm*—RatnerPrestia

(57) ABSTRACT

Cone-shaped projections are provided outside a lens forming area in the middle on one surface of a resin lens plate and depressions to be fitted to these projections are formed on the other surface. A resin lens array is formed by stacking the resin lens plates one over another through fitting these projections and depressions to each other. A fitting depression having a flat supporting seat face at a position on an optical path of light emitted by light-emitting elements of a light-emitting element array chip is formed in the lens holder, and the resin lens array is placed in the fitting depression. A transparent cover composed of a flat and smooth plate is arranged over the output surface of the resin lens array and a metal retainer is attached to the transparent cover so that a pressing pressure is always applied to the resin lens array.

29 Claims, 17 Drawing Sheets

FOREIGN PATENT DOCUMENTS

| | | |
|---|---|---|
| JP | 09-127914 | 5/1997 |
| JP | 09-226167 | 9/1997 |
| JP | 2000-221445 | 8/2000 |
| JP | 2000-295445 | 10/2000 |
| JP | 2001-018451 | 1/2001 |
| WO | WO/0045199 * | 8/2000 |
| WO | WO 00/58762 | 10/2000 |

* cited by examiner

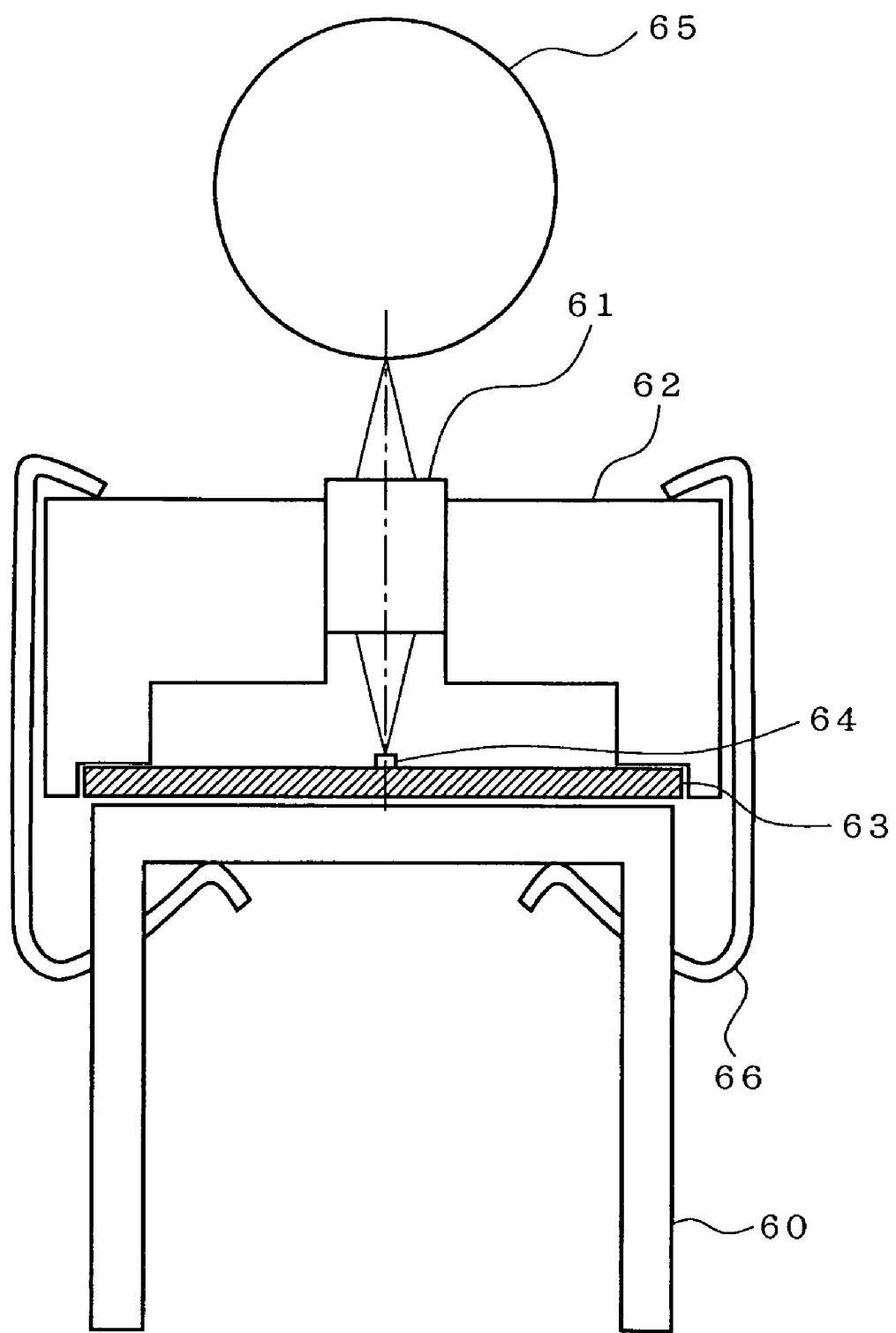
F I G . 1

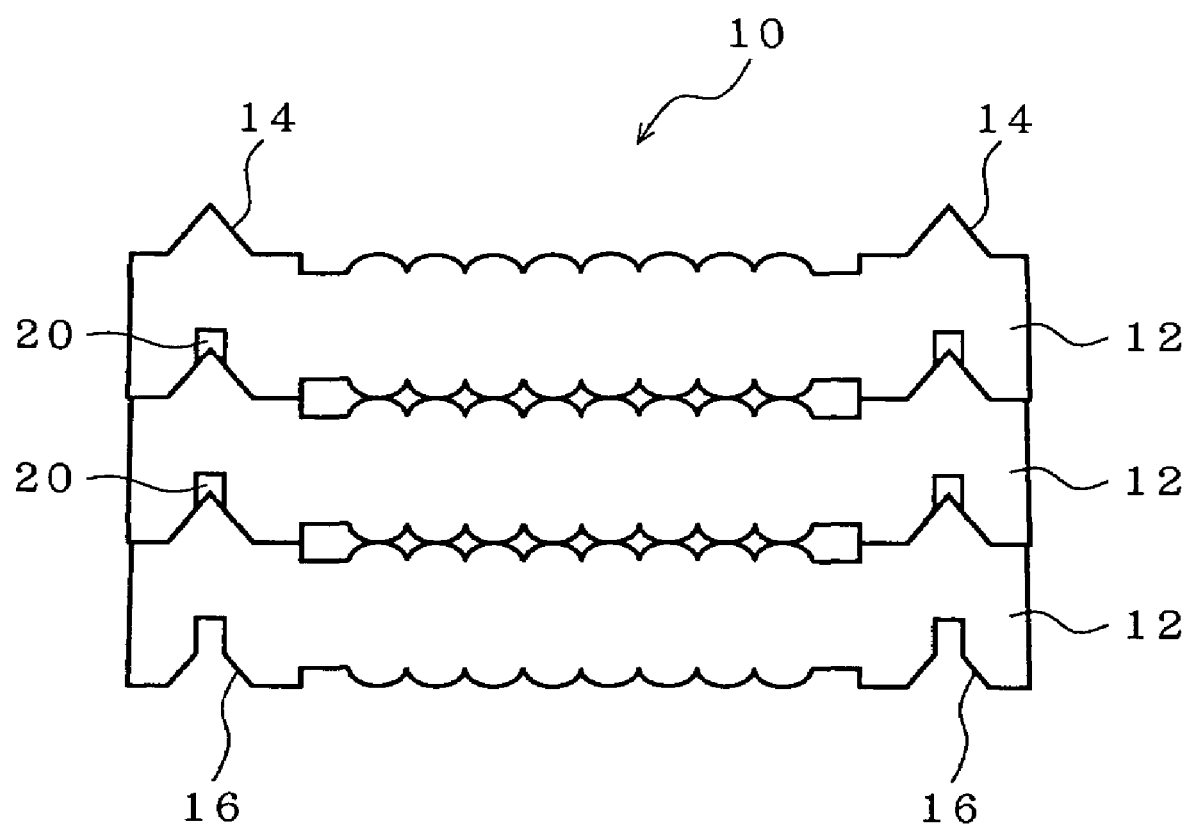
F I G. 3

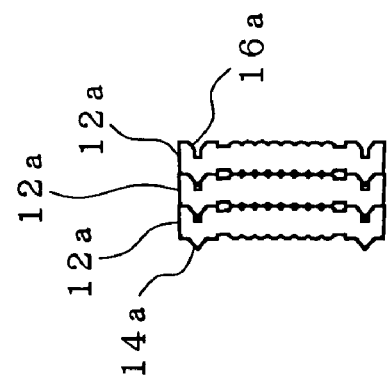
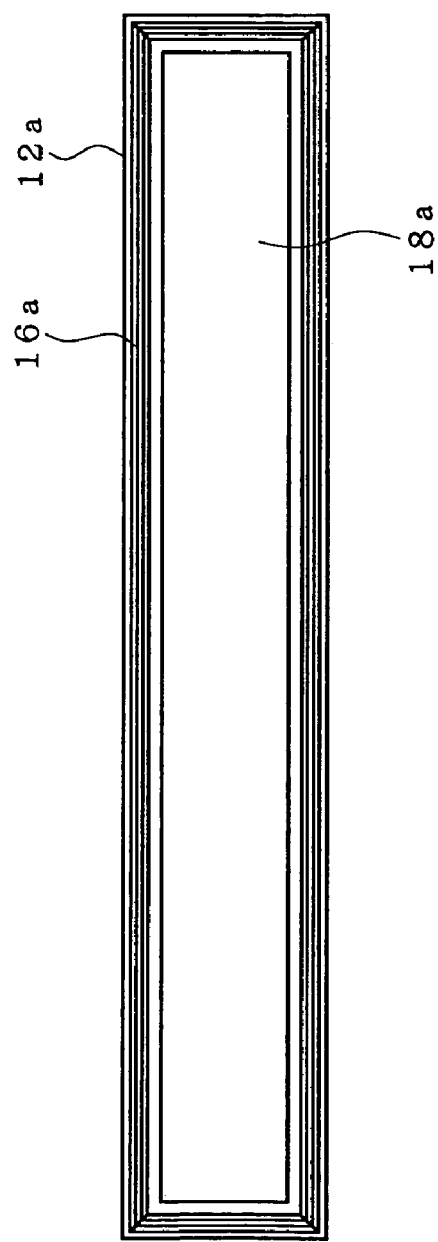
FIG. 4B
FIG. 4A

Composition of AR coat films

| Composition | | Substrate | Film 1 | Film 2 | Film 3 | Film 4 | Film 5 |
|---|---|---|---|---|---|---|---|
| Substrate only | | | | | | | |
| 2-layer AR | (1) | Optical resin 0.9mmt | $Al_2O_3$(121.2nm) | $SiO_2$(134.35nm) | | | |
| | (2) | | $Al_2O_3$(242.4nm) | $SiO_2$(134.35nm) | | | |
| 3-layer AR | $TiO_2$-based | | $Al_2O_3$(121.2nm) | $TiO_2$(179.29nm) | $SiO_2$(134.35nm) | | |
| | $Ta_2O_5$-based | | $Al_2O_3$(121.2nm) | $Ta_2O_5$(192.7nm) | $SiO_2$(134.35nm) | | |
| 4-layer AR | $TiO_2$-based | | $TiO_2$(19.72nm) | $SiO_2$(52.4nm) | $TiO_2$(188.25nm) | $SiO_2$(134.35nm) | |
| | $Ta_2O_5$-based | | $Ta_2O_5$(21.2nm) | $SiO_2$(52.4nm) | $Ta_2O_5$(202.23nm) | $SiO_2$(134.35nm) | |
| 5-layer AR | $TiO_2$-based | | $SiO_2$(50nm) | $TiO_2$(19.72nm) | $SiO_2$(52.4nm) | $TiO_2$(188.25nm) | $SiO_2$(134.35nm) |
| | $Ta_2O_5$-based | | $SiO_2$(50nm) | $Ta_2O_5$(21.2nm) | $SiO_2$(52.4nm) | $Ta_2O_5$(202.23nm) | $SiO_2$(134.35nm) |

F I G. 5

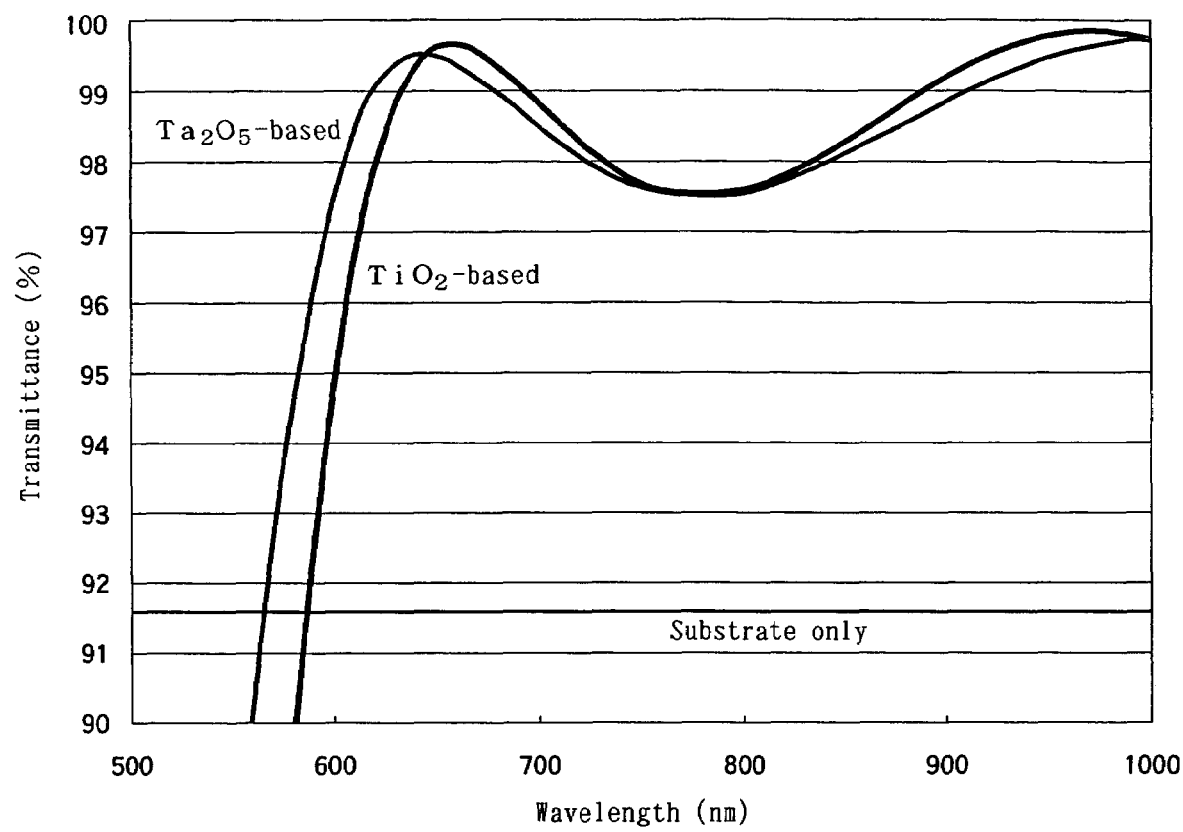
F I G. 7

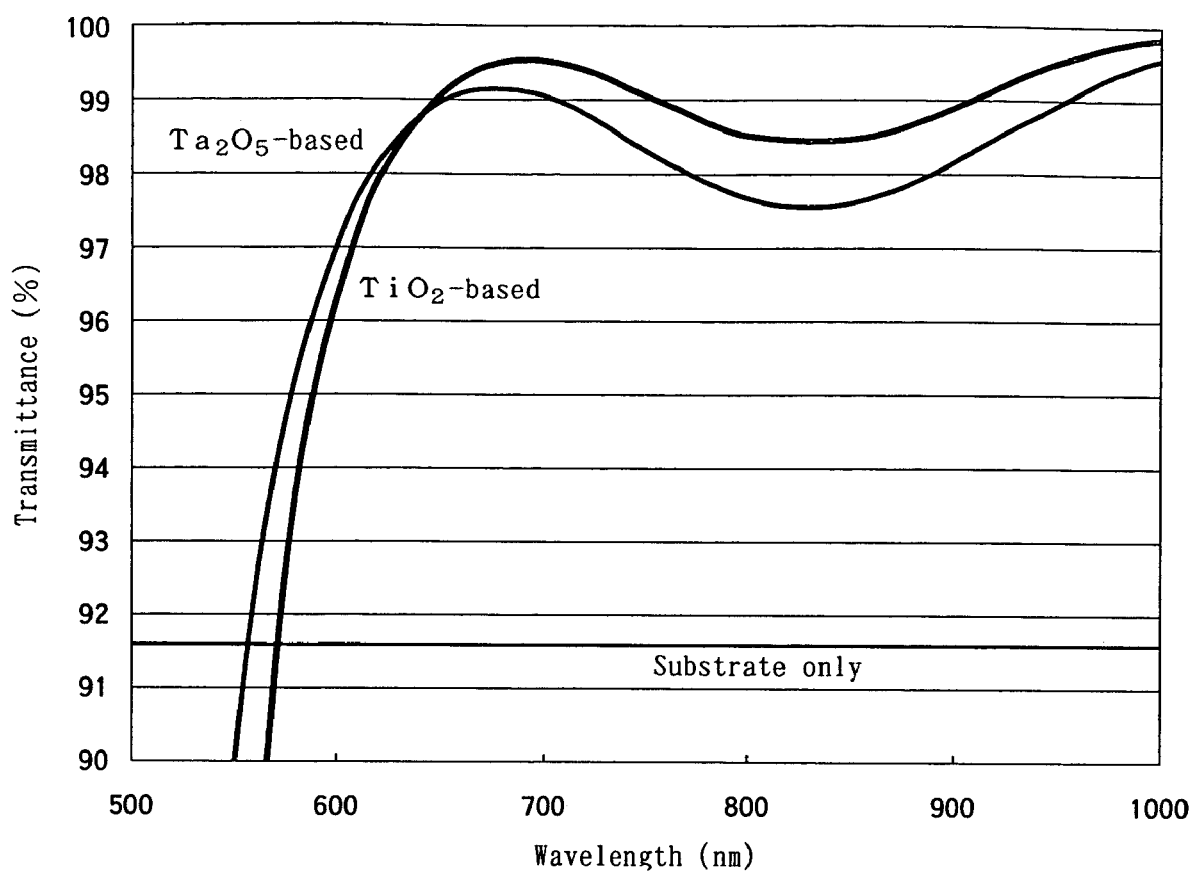
F I G . 9

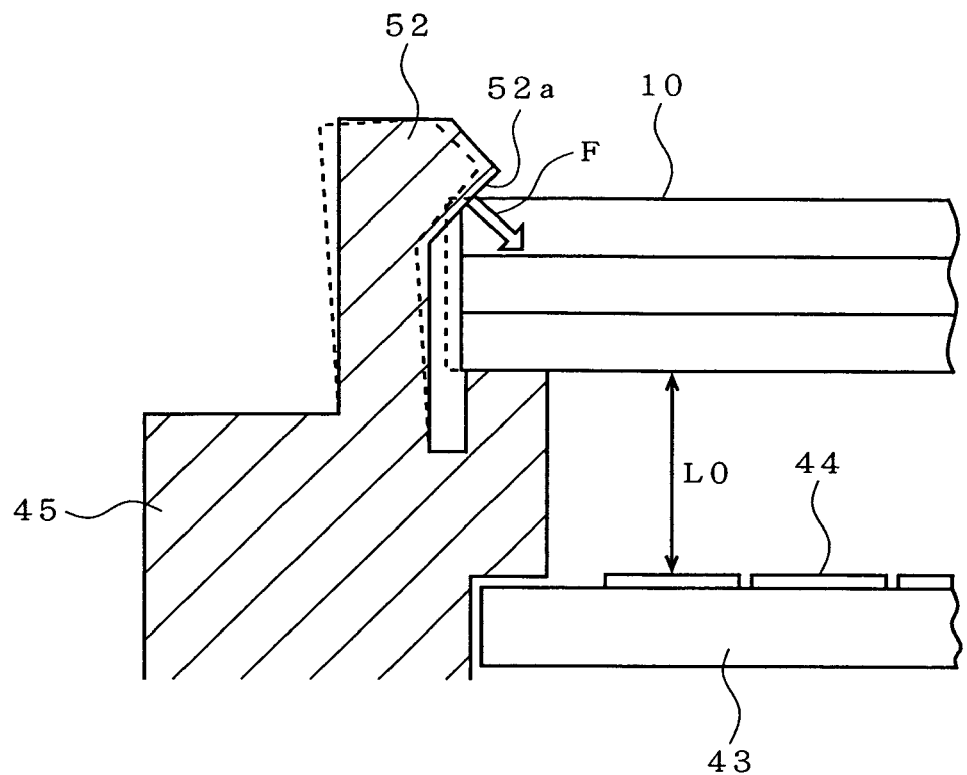
F I G. 1 6
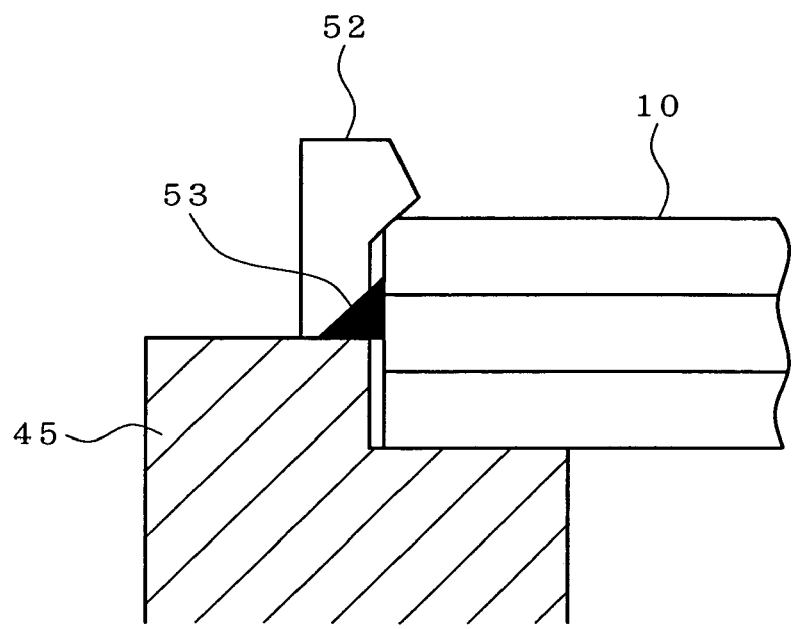
F I G. 1 7

RESIN LENS ARRAY AND OPTICAL WRITING HEAD

TECHNICAL FIELD

The present invention relates to an optical write head mounted on an electro-photographic printer, and collecting and projecting light outputted from a light-emitting element array through a resin lens array on a photosensitive member.

BACKGROUND ART

An electro-photographic printer performs printing by forming a latent image on a photosensitive drum through exposure of the drum, developing this latent image with toner, transferring the toner onto a sheet of paper and fixing the toner on the paper by means of heat or the like.

An exposure process for forming a latent image is classified into an LED optical system and a laser optical system. In a write head (hereinafter, referred to as an optical write head) of an LED optical system, light outputted from the LED is irradiated onto a photosensitive drum through an erecting unit magnification rod lens array.

FIG. 1 is a sectional view taken perpendicularly to the longitudinal direction of an optical write head to be mounted on a conventional electro-photographic printer. In this optical write head, a plurality of light-emitting element array chips 64 each having light-emitting element arranged in line are mounted in the scanning direction on a substrate 63 and an erecting unit magnification rod lens array 61 which is longer in the scanning direction is fixed at a position on an optical path of light outputted by light-emitting elements of the light-emitting element array 64 by a housing 62 made of resin. And the outer edge portions perpendicular to the longitudinal direction of the substrate 63 are engaged with the leg end portions of the housing 62. In addition, a heat sink 60 for radiating heat of the light-emitting element array chips 64 is provided under the substrate 63, and the housing 62 and the heat sink 60 are fixed by metal retainers 66 with the substrate 63 between them.

A photosensitive drum 65 is provided above the rod lens array 61. The rod lens array 61 forms a latent image on the photosensitive drum 65 by collecting light of light-emitting elements of the light-emitting element array chips 64 and exposing the photosensitive drum.

An erecting unit magnification imaging optical system can be very compact by using an optical write head as described above. Since a rod lens array is manufactured by arranging and fixing a number of rod lens elements with resin, however, some irregularity or the like in arrangement of rod lens elements is liable to occur. Such irregularity in arrangement has an influence on the resolution of a rod lens array and makes a cause of image irregularity and the like in a recent machine of high resolution (resolution of 1,200 dpi for example).

In order to suppress the occurrence of such an arrangement irregularity, it is conceived to substitute a resin lens array for a rod lens array as described above. A resin lens array, which realizes an erecting unit magnification imaging optical system by stacking one over another two or more flat lens array plates each having a number of single lenses formed on a transparent substrate, has no possibility of making any arrangement irregularity in the lens array thanks to manufacturing a lens array plate having a number of single lens formed in it by injecting resin into a mold.

An optical write head used in an electro-photographic printer mounted with such a resin lens array is disclosed in Japanese Patent Laid-Open Publication No.2000-221, 445. The optical write head disclosed in this official gazette is a head of an erecting unit magnification optical system improving the resolution by stacking one over another a plurality of resin-molded lens array plates.

However, an optical write head disclosed in Japanese Patent Laid-Open Publication No.2000-221, 445 has the following problems.

In case of stacking a plurality of lens array plates one over another, it is necessary to align them so that the opposing vertexes of lenses are made small in deviation of position relative to one another thereof. In order to use a resin lens array in a high-resolution optical write head, it is necessary to make the size of a single lens as small as possible, and for example in a resin lens array to be used in an optical write head having a resolution of 1200 dpi, a single lens needs to be 0.4 mm or less in diameter according to simulation and naturally the alignment of lenses must be adjusted accurately in the order of micrometers. Therefore, a high accuracy is required for the alignment of lenses and in a structure where a plurality of lens array plates are stacked on one another, the alignment of them is very difficult.

And since a developing roller which discharges toner is located near the output surface of a resin lens array, foreign matters such as toner and the like are floating there and the foreign matters stuck to the output surface of the resin lens array cause deterioration in performance of the optical write head, and therefore removal of the stuck foreign matters is periodically performed by a method of wiping off with soft cloth or the like. However, since a resin lens array using convex lenses has a surface which is depressed and protruded in shape, it is difficult to clean. And since resin generally used in an optical lens is so comparatively soft as to be B to HB (JIS K5401) in pencil hardness, the surface of a resin lens array is liable to be scratched when stuck matters are removed and there is the possibility of deteriorating the optical performance of it.

And resin used generally in an optical lens is 90 to 93% in transmittance (ASTM D1003) and since a lens array which is as bright as possible is needed for high-speed printing, a resin lens array is desired to be made as thin as possible but thinning it leads to remarkable degradation of a shape-retaining ability of the resin lens array itself. Mounting a resin lens array having a poor shape-retaining ability on a head with a high positioning accuracy leads to more complication and higher precision in structure of members supporting the resin lens array and results in increasing the cost of components.

And since resin used in an optical lens is generally high in coefficient of thermal expansion, in case of sticking and fixing a resin lens array to a housing formed out of a rigid material, the occurrence of strain caused by the difference in coefficient of thermal expansion between the resin lens array and the housing deforms the resin lens array and thereby lowers the accuracy of position of the resin lens array. And since in a resin lens array an adhesive agent is generally used for fixing lens array plates to each other, the slippage in stacking position caused by exfoliation in the adhesive interface between the lens array plates deteriorates remarkably the quality of image.

And since a resin lens array is low in rigidity and has a poor self-shape-retaining ability, to fix the resin lens array highly flat, it needs to be fixed in position along a datum plane of another member which is high in flatness. In this case, for example a method of attaching a resin lens array to a datum plane of a housing and fixing the housing and the resin lens array to each other with an adhesive agent is conceivable, but this method needs to keep the whole resin lens array attached to the housing pressed into the housing side until the adhesive agent is hardened so as to be fixed along the datum plane and requires a considerably long time in the manufacturing process.

And when a light beam reaches the interface between transparent media which is different in refractive index from each other, a part of the light beam is reflected by the interface and the other parts pass through the interface and enters the next medium. The quantity of reflected light at an incident angle of 0° between an optical resin lens and an air layer is about 4%. That is to say, the transmittance in case that a light beam passes through a single lens array plate is:

$$(1-0.04 \times 2) \times 100 = 0.92 \times 100 = 92 \ (\%).$$

In an optical system in which n lens array plates are stacked one over another, since a light beam passes through the n lens array plates, the total transmittance becomes $(0.92^n \times 100)$ %. This means using a plurality of lens array plates reduces the total quantity of transmitted light. For example, the total transmittance of a structure in which lens array plates of three layers and a protective cover of one layer are used is $0.92^4 \times 100 = 72\%$ and results in bringing about the reduction in quantity of light of 28%.

DISCLOSURE OF THE INVENTION

The present invention has been performed paying attention to such conventional problems, and an object of the invention is to provide an optical write head mounted with a resin lens array enabling low-price and high-quality printing.

A resin lens array according to a first aspect of the present invention is formed by stacking one over another a plurality of resin lens plates each having spherical or aspherical microlenses regularly arranged at specific intervals on a flat plate. The resin lens plate has cone-shaped projections formed at specific intervals outside the area in which lenses are formed on one surface and depressions to be fitted to these projections formed outside the area in which lenses are formed on the other surface, and the resin lens array is formed by stacking the resin lens plates one over another through fitting the projections and the depressions to each other.

Or the resin lens plate has projections which is triangle-shaped in section and continuous or which is triangle-shaped in section and successive at specific intervals outside the area in which lenses are formed on one surface and depressions to be fitted to these projections formed outside the area in which lenses are formed on the other surface, and the resin lens array is formed by stacking the resin lens plates one over another through fitting the projections and the depressions to each other.

And an optical write head according to a second aspect of the present invention is a head which collects and projects light outputted from an light-emitting element array chip having light-emitting elements arranged in line on a photosensitive member through a resin lens array formed by stacking one over another a plurality of resin lens plates each having spherical or aspherical microlenses regularly arranged at specific intervals on a flat plate, and the resin lens plate has projections outside the area in which lenses are formed on one surface and depressions to be fitted to these projections formed outside the area in which lenses are formed on the other surface, and the resin lens array is formed by stacking the resin lens plates one over another through fitting the projections and the depressions to each other.

Furthermore, an optical write head according to a third aspect of the present invention is a head which collects and projects light outputted from an light-emitting element array chip having light-emitting elements arranged in line on a photosensitive member through a resin lens array formed by stacking one over another a plurality of resin lens plates each having spherical or aspherical microlenses regularly arranged at specific intervals on a flat plate, and the resin lens array is housed in an opening formed in a supporting means for supporting the resin lens array and is supported by the supporting means through engaging portions having projections at the opening side.

BRIEF DESCRIPTION OF THE DRAWINGS

FIG. 1 is a sectional view taken perpendicularly to the longitudinal direction of an optical write head to be mounted on a conventional electro-photographic printer.

FIG. 3 is a magnified side view of the resin lens array.

FIG. 4A is a plan view showing another example of a resin lens array.

FIG. 4B is a side view showing said another example of the resin lens array.

FIG. 5 is a diagram showing the conditions of film type, film thickness and number of layers in case of simulating the transmittance depending on an AR-coated film.

FIG. 7 is a diagram showing the relation between transmittance and wavelength in case of forming a three-layer AR coat film.

FIG. 9 is a diagram showing the relation between transmittance and wavelength in case of forming a five-layer AR coat film.

FIG. 16 is a sectional view of an end portion in the longitudinal direction of the lens holder and the resin lens array taken along to the longitudinal direction of them.

FIG. 17 is a sectional view taken along line B–B' of FIG. 14.

BEST MODE FOR CARRYING OUT THE INVENTION

Figure 2B:
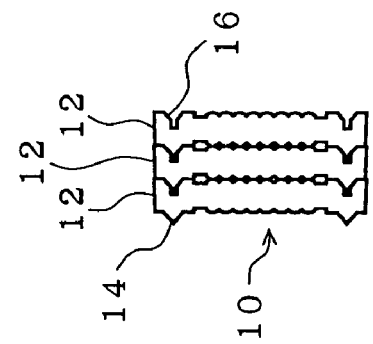
FIG. 2B is a side view of the resin lens array according to the first embodiment.

Next, a first embodiment of the present invention is described with reference to the drawings.

A resin lens array according to the first embodiment of the present invention is formed by closely stacking resin lens plates each having a number of lenses formed on one or both faces of itself one over another so as to have at least three surfaces having lenses formed. FIG. 2A is a plan view of a resin lens array according to the first embodiment to be mounted on an optical write head, FIG. 2B is a side view of the resin lens array and FIG. 3 is a magnified side view of the resin lens array.

A resin lens array 10 is composed of three resin lens plates 12. The resin lens plate 12 is in the shape of a narrow and long rectangle, and has a number of convex microlenses arranged in a lens forming area 18 of the middle part of it. The microlenses are formed on both faces of the resin lens plate 12. A convex microlens formed in the resin lens plate 12 may be either a spherical lens or an aspherical lens.

And the resin lens plate 12 has cone-shaped projections 14 for aligning a resin lens plate 12 to be stacked which are provided outside a lens forming area 18 on one surface of the resin lens plate 12, and has depressions 16 to be fitted to these cone-shaped projections 14 provided on the other surface. The resin lens array 10 is formed by stacking the resin lens plates 12 one over another through fitting the projections 14 into the depressions 16.

Figure 2A:
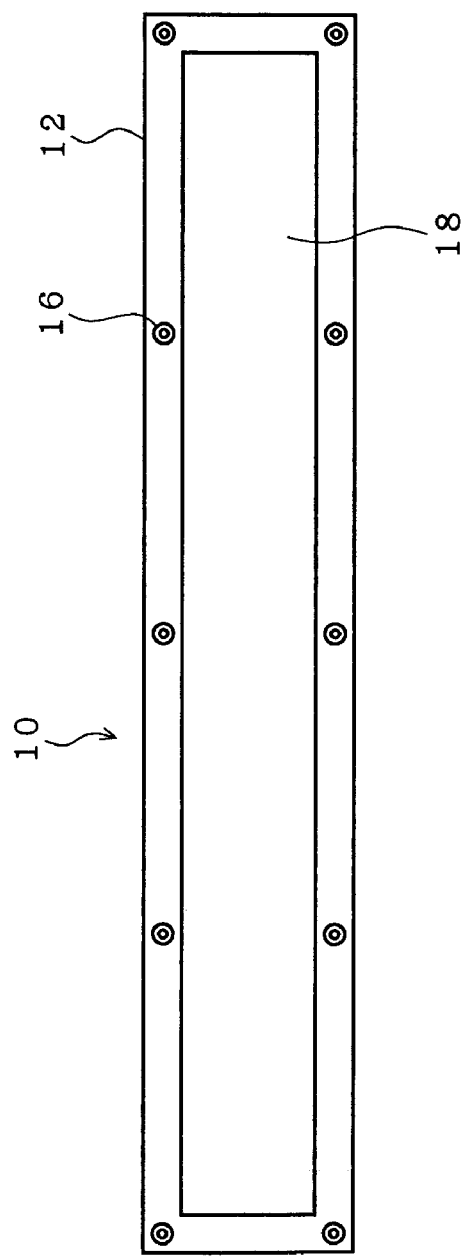
FIG. 2A is a plan view of a resin lens array according to a first embodiment.

It is desirable that the projections 14 and the depressions 16 for alignment are arranged at intervals of 15 to 60 mm in the longitudinal direction around the lens forming area 18 of the resin lens plate 12, as shown in FIGS. 2A and 2B.

These projections and depressions to be provided on a resin plate are formed by injection-molding resin. An injection molding method injects resin into a metal mold having the upper and lower metal molds closed by means of an extruder and then hardens the resin inside the metal mold by gradually cooling it, and thereafter opens the upper and lower metal molds and pulls out a resin lens plate. When a side face having projections is provided along the direction of pulling out from the metal mold, this side face makes a mold-releasing resistance between the metal mold and the resin lens plate to provide a one-sided load in a mold-releasing operation and thus there is the possibility of deforming the resin lens plate. Therefore, it is desirable that the projection and depression each are in the shape of an easy-released taper having a gradient of 3° or more.

FIG. 4A is a plan view showing another example of a resin lens array, and FIG. 4B is a side view of the resin lens array. A continuous projection 14a, which is triangular in section, and a continuous depression 16a to be fitted to this projection are formed around a lens forming area 18a of a resin lens plate 12a to form a resin lens array.

Parts for aligning resin lens plates may be in the shape of a projection and a depression to be fitted to this projection which is triangular in section and continuous or may be in the shape of projections and depressions to be fitted to these projections which are triangular in section and successive at regular intervals.

And an AR (anti-reflection) coat film (antireflection coating) is formed on each of both surfaces of a resin lens plate to form a resin lens array described above. It is desirable to form an AR coat film on each of both surfaces of a resin lens plate in order to reduce reflected light. The AR coat film is formed by a vapor deposition method, a sputtering method or the like. This embodiment has formed an AR coat film by stacking an $Al_2O_3$ film (121 nm in thickness) and a $SiO_2$ film (134 nm in thickness) in order on each of both surfaces of a resin lens plate by means of a vapor deposition method. The transmittance of one resin lens plate at a wavelength of 750 nm which is a general emitted light wavelength of a light-emitting element has been 92% in case of having no AR coat film but has been improved to 97.5% by the AR coat film. In case of stacking n resin lens plates one over another, the total transmittance has been able to be improved from $0.92^n \times 100\%$ to $0.975^n \times 100\%$.

The composition of an AR coat film is not limited to two layers of an $Al_2O_3$ film (121 nm in thickness) and a $SiO_2$ film (134 nm in thickness) but may be different in film thickness or different in number of layers and may be different in type of films in order to enhance the optical transmittance. The transmittance can be more improved depending on the film type, the film thickness, the number of layers and the like of an AR coat film.

FIG. 5 is a diagram showing the conditions of film type, film thickness and number of layers in case of simulating the transmittance depending on an AR coat film. FIGS. 6 to 9 show the relation between transmittance and wavelength in case of forming an AR coat film under the conditions shown in FIG. 5 taking the film type, film thickness and number of layers as parameters.

Figure 6:
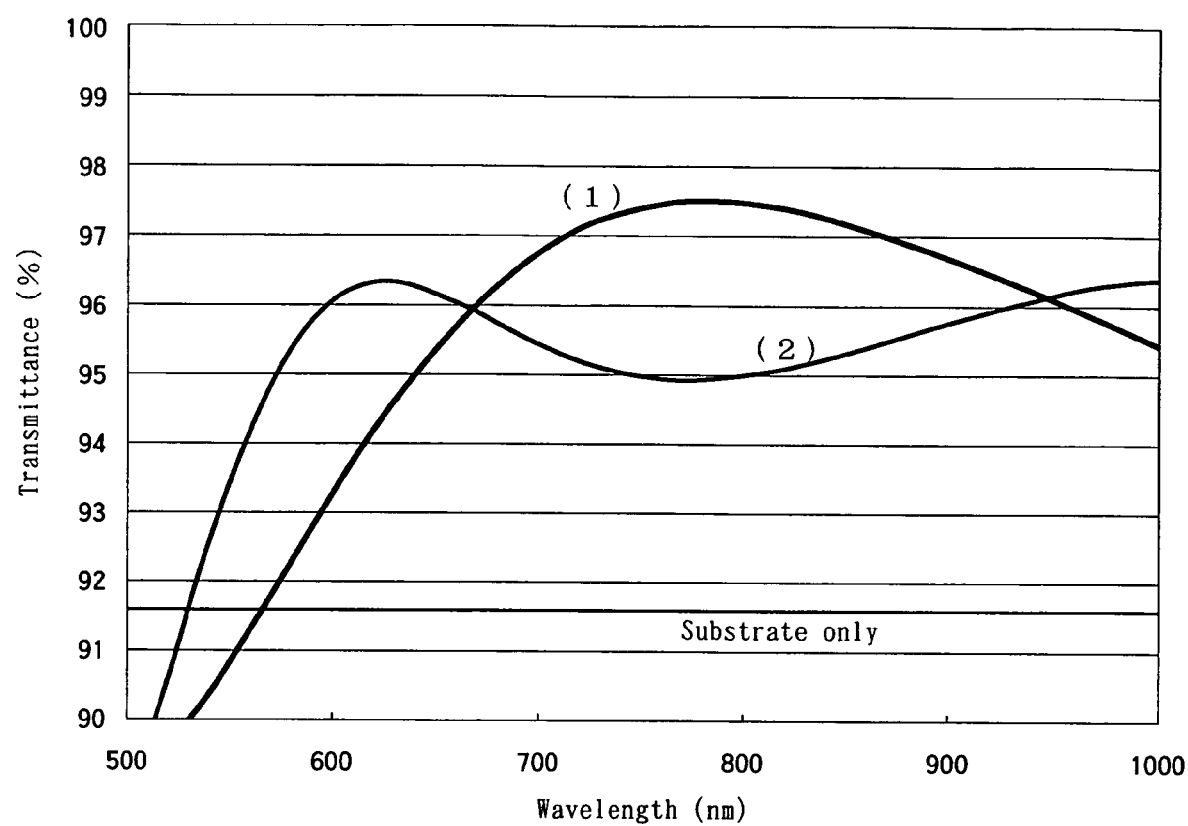
FIG. 6 is a diagram showing the relation between transmittance and wavelength in case of forming a two-layer AR coat film.
Figure 8:
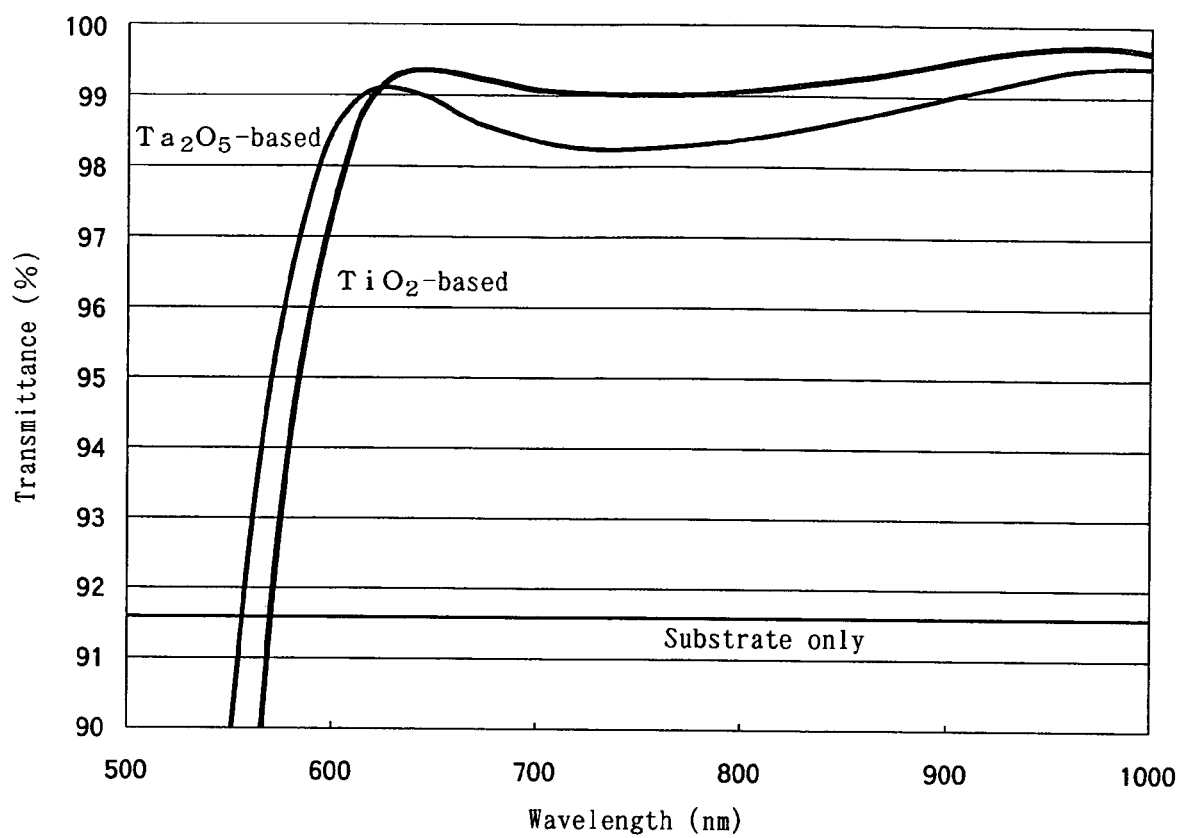
FIG. 8 is a diagram showing the relation between transmittance and wavelength in case of forming a four-layer AR coat film.

FIG. 6 is a diagram showing the relation between transmittance and wavelength in case of forming an AR coat film by stacking two layers of an $Al_2O_3$ film and a $SiO_2$ film in order on each of both surfaces of a resin lens plate, FIG. 7 is a diagram showing the relation between transmittance and wavelength in case of forming an AR coat film by stacking three layers of an $Al_2O_3$ film, a $TiO_2$ (or $Ta_2O_5$) film and a $SiO_2$ film in order on each of both surfaces of a resin lens plate, FIG. 8 is a diagram showing the relation between transmittance and wavelength in case of forming an AR coat film by stacking four layers of a $TiO_2$ (or $Ta_2O_5$) film, a $SiO_2$ film, a $TiO_2$ (or $Ta_2O_5$) film and a $SiO_2$ film in order on each of both surfaces of a resin lens plate, and FIG. 9 is a diagram showing the relation between transmittance and wavelength in case of forming an AR coat film by stacking five layers of a $SiO_2$ film, a $TiO_2$ (or $Ta_2O_5$) film, a $SiO_2$ film, a $TiO_2$ (or $Ta_2O_5$) film and a $SiO_2$ film in order on each of both surfaces of a resin lens plate.

For example, by using a four-layer AR coat film of FIG. 5 having a $TiO_2$ film, a $SiO_2$ film, a $TiO_2$ film and a $SiO_2$ film stacked one over another in order on each of both surfaces of a resin lens plate, it is possible to improve the transmittance of a resin lens plate to 99% or more over the range of 620 nm to 1 μm or more in wavelength.

In case of stacking and fixing resin lens plates to one another, the method applies a UV (ultra-violet) hardening adhesive agent to depressions for alignment and then fits projections for alignment into these depressions, irradiates the projections and depressions for alignment and the vicinity of them with ultraviolet rays, hardens the adhesive agent and thereby aligns and fixes the resin lens plates to one another.

At this time, as shown in FIG. 3, a hole 20 for making an excessive adhesive agent escape when fitting a projection 14 and a depression 16 of resin lens plates to each other may be formed at the bottom of the depression 16. By forming such a hole 20, it is possible to suppress overflow of the adhesive agent from the depression 16. In case that a depression is continuously formed as shown in FIGS. 4A and 4B, a groove (not illustrated) for making an adhesive agent escape is formed in the bottom of the depression 16a.

In case of stacking a plurality of resin lens plates as described above, the alignment of each lens can be performed with high accuracy by simple operations through fitting the depressions and projections to each other.

Next, a second embodiment of the present invention is described with reference to the drawings.

Figure 10C:
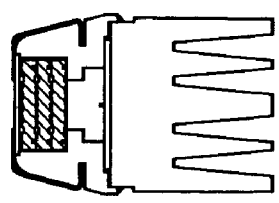
FIG. 10C is a sectional view taken perpendicularly to the longitudinal direction of an optical write head according to the second embodiment.
Figure 10A:
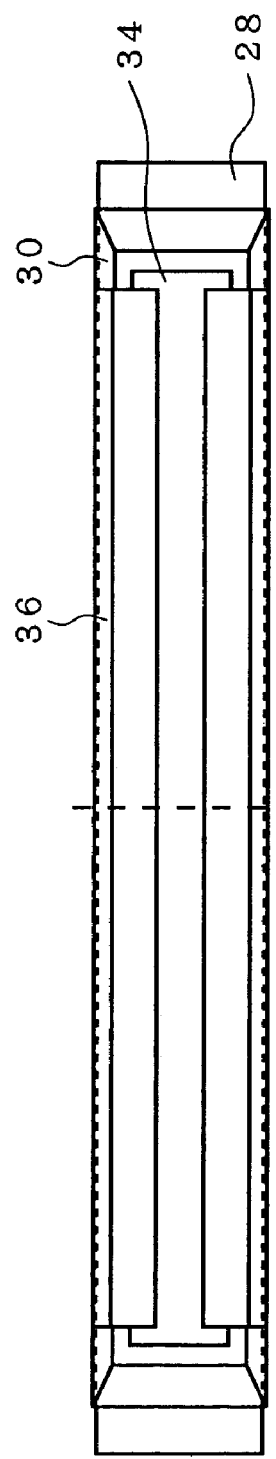
FIG. 10A is a plan view of an optical write head according to a second embodiment.
Figure 10B:
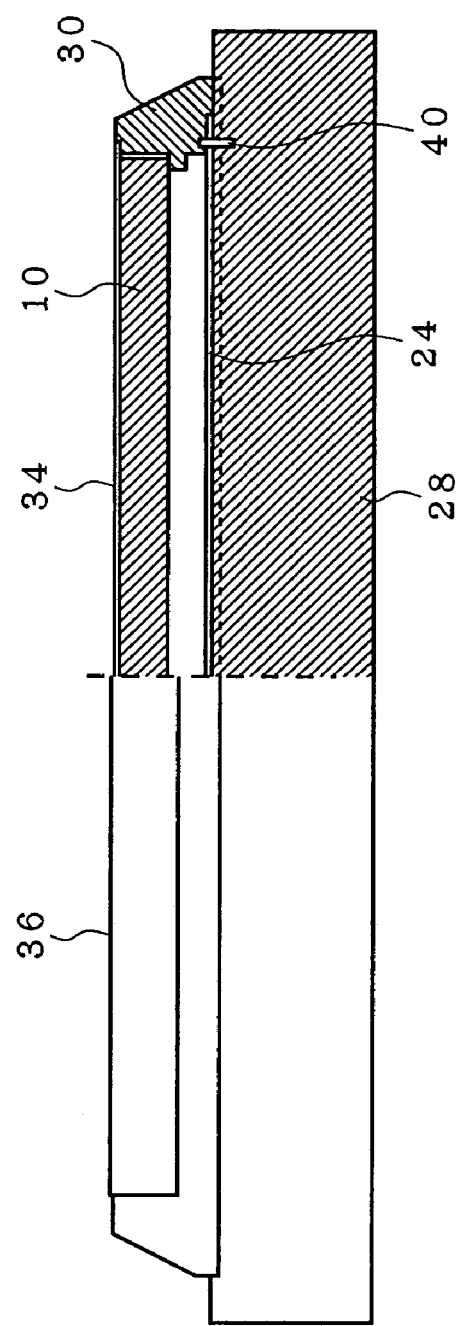
FIG. 10B is a front view, partly in section, of an optical write head according to the second embodiment.
Figure 11:
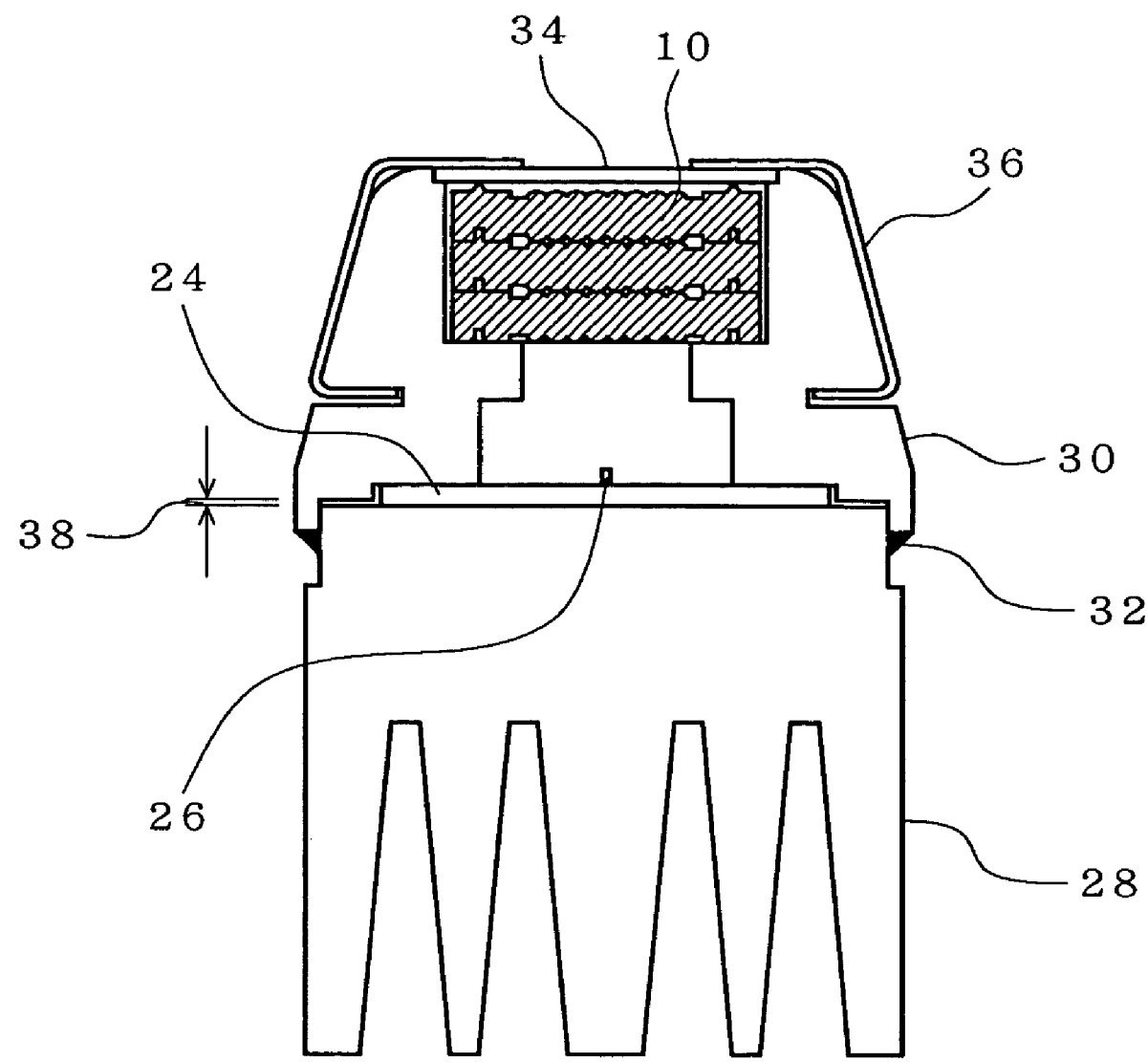
FIG. 11 is a magnified sectional view of an optical write head.

FIG. 10A is a plan view of an optical write head according to a second embodiment, FIG. 10B is a front view, partly in section, of the optical write head, FIG. 10C is a sectional view taken perpendicularly to the longitudinal direction (scanning direction) of the optical write head, and FIG. 11 is a magnified sectional view of the optical write head.

A substrate 24 is fixed on a heat sink 28 and a plurality of light-emitting element array chips 26 each having light-emitting elements arranged in line are mounted along the scanning direction on the substrate 24. Parts of the bottom of legs of a lens holder (supporting means) 30 are engaged with the upper faces of end portions taken perpendicularly to the scanning direction of chips of the substrate 24. And projections provided on the end portions of the legs of the lens holder 30 are fixed by an adhesive agent to the side faces of the heat sink 28 as providing gaps 38 between the heat sink 28 and the lens holder 30.

The lens holder 30 has a fitting depression having a flat supporting seat face formed at a position on an optical path of light emitted by light-emitting elements of a light-emitting element array chip 26, and a resin lens array 10 according to the first embodiment is placed in the fitting depression of the lens holder 30. A transparent cover 34 composed of a flat plate is arranged over the output surface of the resin lens array 10 and metal retainers 36 are attached to the transparent cover 34 so that a pressing pressure is always applied to the resin lens array 10.

The heat sink 28 is made of aluminum and preferably uses a material capable of being made by a drawing process in order to reduce the cost. Nonferrous metal or metal material other than aluminum may be used as a material for the heat sink 28.

Figure 12:
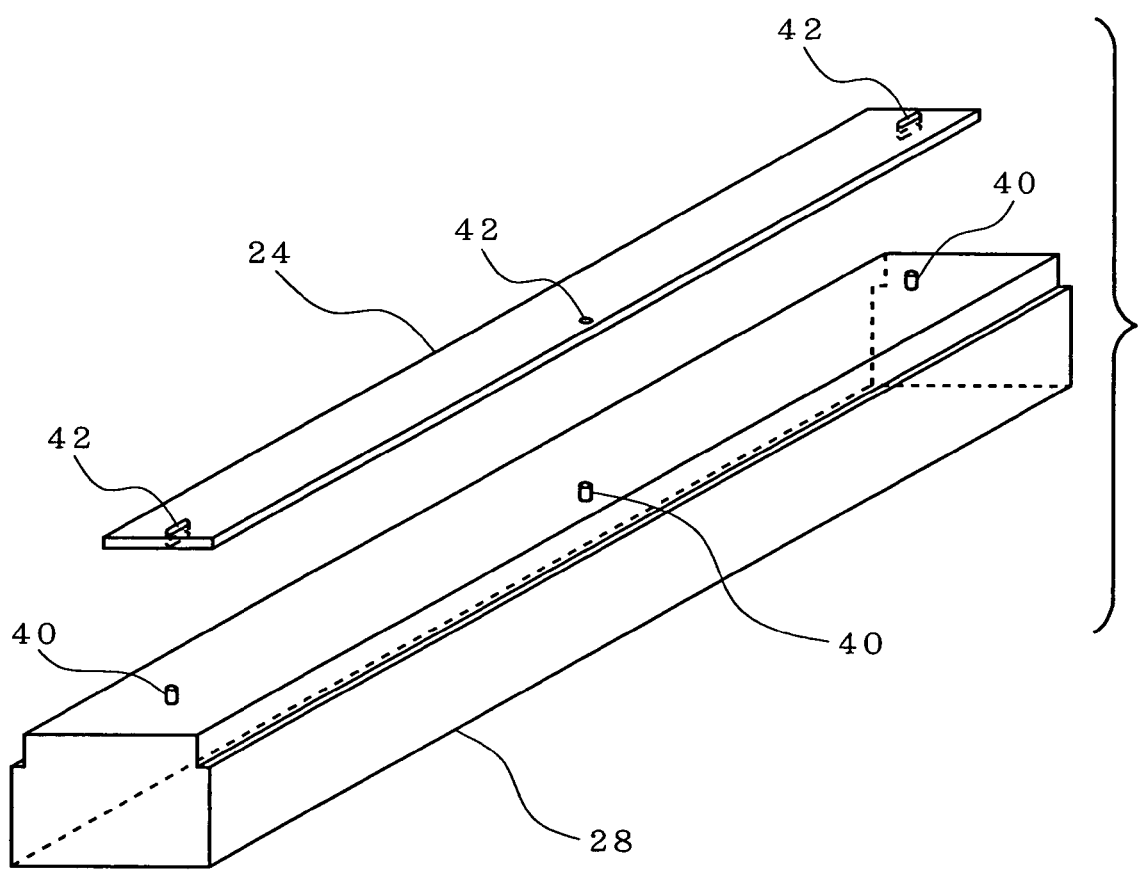
FIG. 12 is a perspective view of a heat sink and a substrate.

FIG. 12 is a perspective view of a heat sink and a substrate. The heat sink 28 is provided with a plurality of pins 40 for performing alignment and the substrate 24 to be mounted with light emitting array chips is also provided with holes 42 for having the pins 40 inserted into them at positions corresponding to the pins 40. The substrate 24 and the heat sink 28 are aligned with each other by inserting the pins 40 into the holes 42.

As shown in FIG. 12, the holes 42 provided at both end portions in the longitudinal direction of the substrate 24 may be slots which is longer in the scanning direction of chips. By making the holes at both end portions slot-shaped, it is possible to absorb the strain caused by the difference in coefficient of thermal expansion between the substrate 24 and the heat sink 28 through the holes 42.

A material for the substrate 24 is preferably aluminum which is the same material as the heat sink 28 but may be any of a glass-epoxy substrate, a metal substrate and a nonferrous metal substrate.

A resin material capable of being injection-molded is preferably used for the lens holder 30. Since it is possible to absorb the strain caused by the difference in coefficient of thermal expansion between the substrate 24 and the heat sink 28 by using a material having a coefficient of thermal expansion approximate to that of the heat sink 28 for the lens holder 30, this embodiment uses a resin material comparatively low in coefficient of thermal expansion having carbon fiber mixed with the resin. A resin material having glass short fiber mixed with it may be used for the lens holder 30.

As shown in FIG. 11, the lens holder 30 and the heat sink 28 are fixed together by providing a gap 38 between the heat sink 28 and the lens holder 30 and fixing projections provided at the leg end portions of the lens holder 30 to the side faces of the heat sink 28 by means of an adhesive agent 32.

The reason for the gap 38 being provided between the heat sink 28 and the lens holder 30 is to allow the lens holder 30 to be fixed on the heat sink 28 under the condition of the lens holder 30 contacting with not the surface of the heat sink 28 on which the substrate 24 is mounted, but upper surface of the substrate 24 in order to secure with high accuracy an working distance between the light emitting points of a light-emitting element array chip 26 mounted on the substrate 24 and the incident surface of a resin lens array 10 supported by the lens holder 30.

A resin lens array 10 composed of a plurality of resin lens plates is placed in a fitting depression of the lens holder 30. It is necessary that the fitting depression of the lens holder 30 having the resin lens array 10 placed in it is made rather longer in shape than the resin lens array 10 in the longitudinal direction in consideration of the difference in coefficient of thermal expansion between the materials.

For example, on the assumption that the coefficient of thermal expansion of a lens holder is $2.2 \times 10^{-5}/°$ C., the coefficient of thermal expansion of a resin lens array is $8.0 \times 10^{-5}/°$ C., a temperature change is 40° C. and the exposure width (length of the resin lens array) of an optical write head of A3-sized paper in Japanese Industrial Standard is about 320 mm, the following conditions are obtained:

Exposure length=320 mm,

Temperature difference=40° C.,

Difference in coefficient of thermal expansion=$(8.0-2.2) \times 10^{-5}/°$ C.=$5.5 \times 10^{-5}/°$ C., Difference in displacement between the members=$320 \times 40 \times 5.8 \times 10^{-5}$=0.74 mm, and the difference in displacement caused by the difference in coefficient of thermal expansion between the lens holder and the resin lens array becomes 0.74 mm. In order to absorb this difference in displacement caused by the difference in coefficient of thermal expansion, the fitting depression to have the resin lens array placed in it needs to be made 0.8 mm or longer in shape than the resin lens array.

And the resin lens array 10 and the lens holder 30 may be aligned with each other by providing pins for alignment both end portions in the longitudinal direction of a flat supporting seat face of the fitting depression, providing holes to have the pins inserted into them at positions corresponding to these pins in the longitudinal direction of the resin lens array 10 and inserting the pins into these holes. In this case, when one of the holes to have the pins for alignment inserted into them is made into a round hole and the other is made into a slot longer in the chip scanning direction, in case that a difference in displacement caused by the difference in coefficient of thermal expansion occurs between the lens holder 30 and the resin lens array 10, the slot of the resin lens array 10 can absorb this difference in displacement.

After the resin lens array 10 has been placed in the fitting depression of the lens holder 30, a transparent cover 34 is attached over it and metal retainers 36 are attached to the transparent cover 34. The metal retainer 36 is formed out of a plate spring, and one end portion of the plate spring is inserted into a groove provided in a side face of the lens holder 30 and the other end portion is pressed against the peripheral part of the surface of the transparent cover 34 corresponding to the position outside the lens forming area of the resin lens array 10.

Since a structure in which the resin lens array 10 is pressed down against the lens holder 30 by the metal retainers 36 such as plate springs and the like is made, the stress between both the components can be released. The transparent cover 34 and the resin lens array 10 are fixed to the lens holder 30 by these metal retainers 36.

In order to prevent dust such as toner and the like from coming into a head, it is necessary to apply a sealant such as silicone or the like to the joint of the resin lens array 10 and the lens holder 30, and in order to release the stress between the above-mentioned components the sealant is preferably about 100 (JIS-A) in hardness.

It is enough that the transparent cover 34 is made of a transparent material, and this embodiment has used a soda-lime glass plate. The transparent cover 34 may also be provided with an AR coat film.

If a glass plate the surface of which is flat and smooth is adopted as the transparent cover 34, since the surface of it can be kept hard, even when toner is stuck, the dirt can be easily removed with waste cloth and the like and the resin lens array is difficult to be scratched and therefore the deterioration in performance is difficult to occur.

Figure 13:
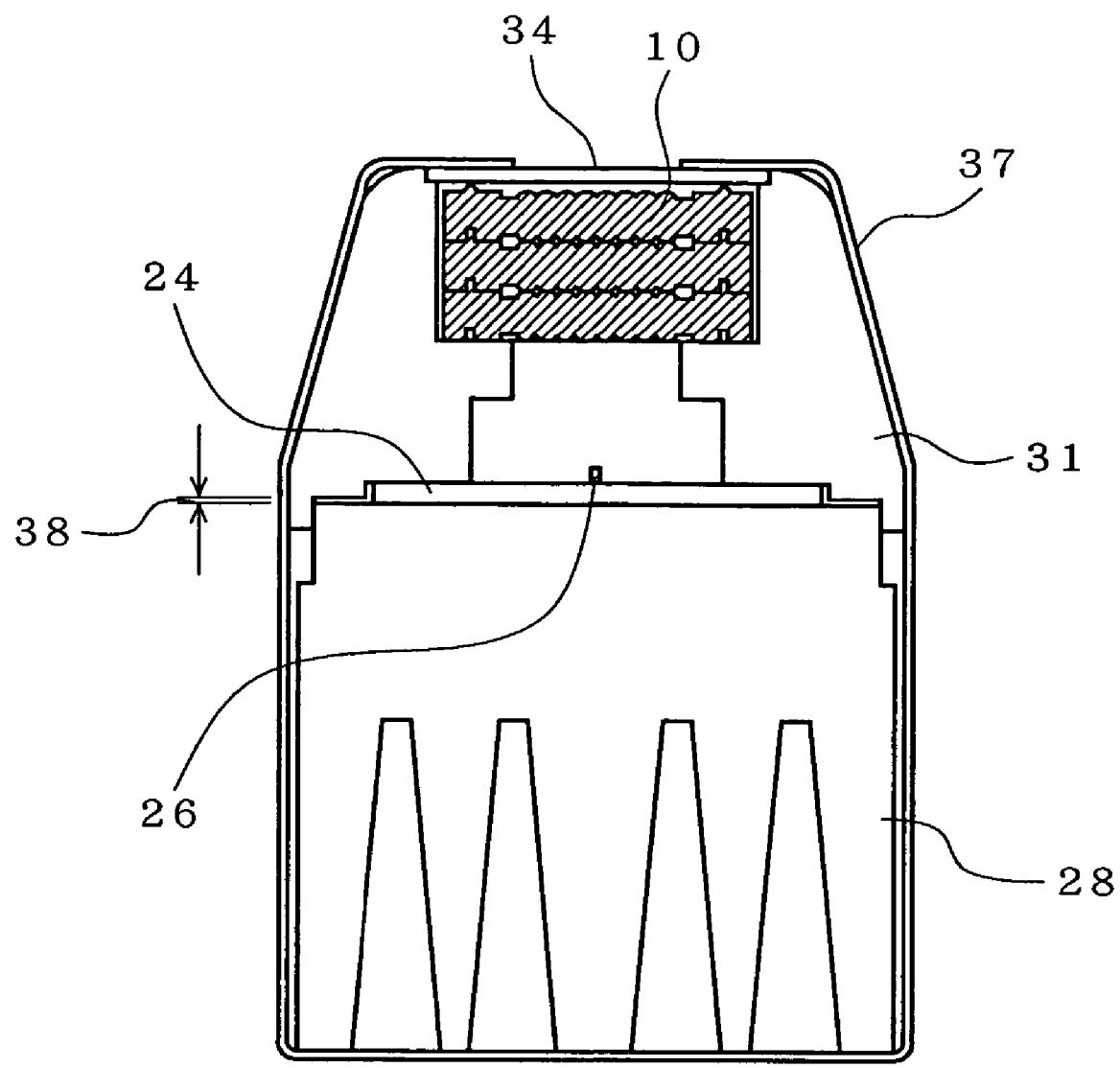
FIG. 13 is a magnified sectional view showing a variant example of an optical write head.

FIG. 13 is a magnified sectional view showing a variant example of an optical write head shown in FIG. 11. The optical write head shown in FIG. 13 covers the outer circumference of a heat sink 28 with a metal retainer 37 such as a plate spring which is extended to have enough length to cover the outer circumference of a heat sink 28, presses the heat sink 28 against a lens holder 31 by means of this metal retainer 37 and thereby fixes the lens holder 31 and the heat sink 28 to each other in this state. Since the other points are the same as FIG. 11, the description of them is omitted.

In the optical write head shown in FIG. 13, the lens holder 31 and the heat sink 28 can be fixed to each other without using an adhesive agent.

Next, a third embodiment of the present invention is described with reference to the drawings.

Figures 14A, 14B:
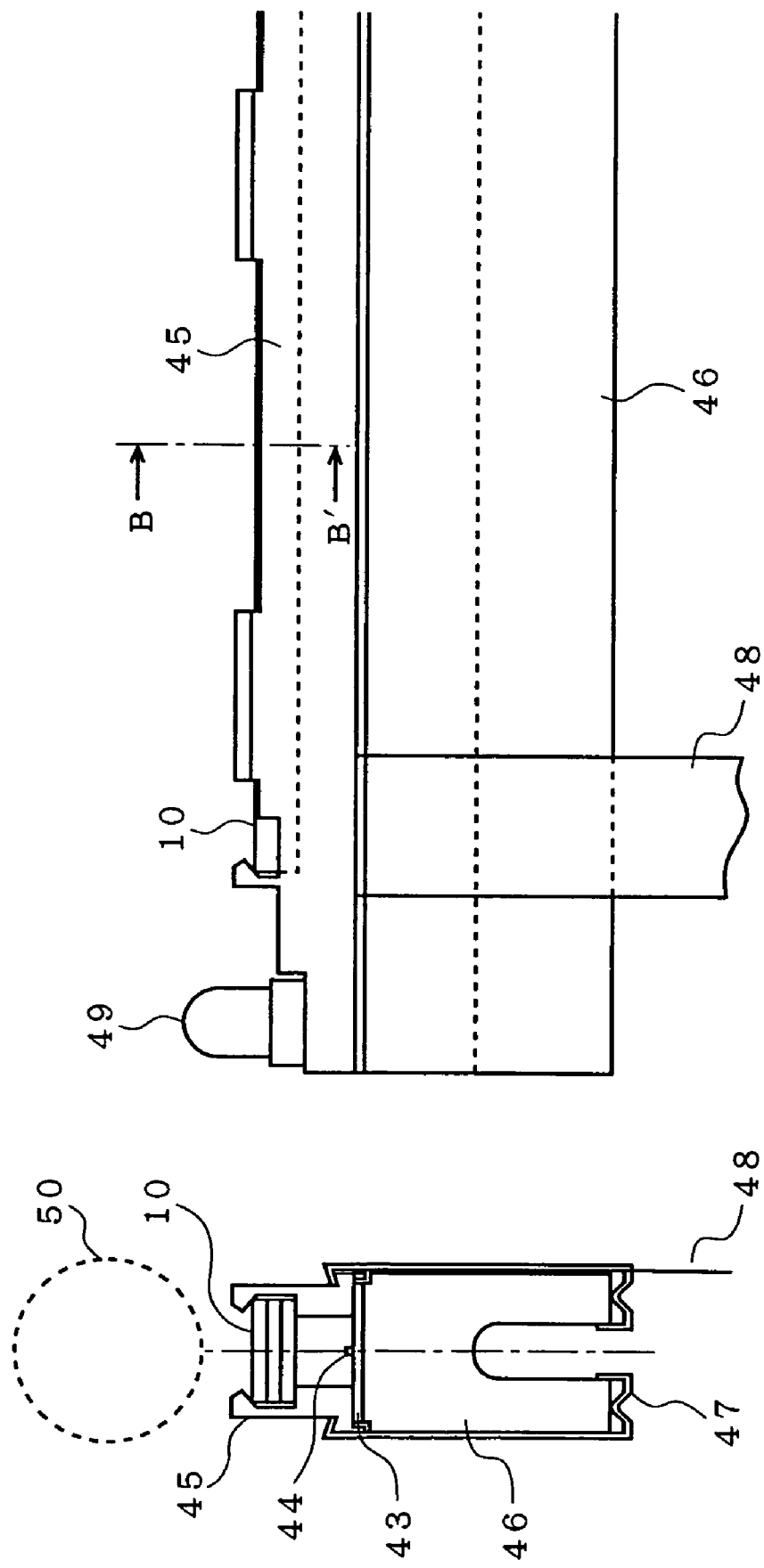
FIG. 14A is a sectional view of the middle part of an optical write head according to a third embodiment taken perpendicularly to the longitudinal direction of the head.
FIG. 14B is a partial front view of the optical write head according to the third embodiment.

FIG. 14A is a sectional view of the middle part in the longitudinal direction (scanning direction) of an optical write head according to a third embodiment taken perpendicularly to the longitudinal direction of the head, and FIG. 14B is a partial front view of the optical write head.

A plurality of light-emitting element array chips 44 each having light-emitting elements arranged in line are mounted on a substrate 43. A resin lens array 10 according to the first embodiment is supported by engaging portions formed on the lens holder. (supporting means) 45 in a lens holder 45 and at a position on an optical path of light emitted from light-emitting elements of these light-emitting element array chips 44. The resin lens array 10 is formed out of three resin lens plates each having convex microlenses arranged regularly at specific intervals on a transparent flat plate stacked one over another.

And the outer edges taken perpendicularly to the longitudinal direction of the substrate 43 are engaged with the leg end portions of the lens holder 45. And a heat sink 46 for discharging heat of the light-emitting element array chips 44 is provided under the substrate 43, and the lens holder 45 and the heat sink 46 are fixed to each other by metal retainers 47 with the substrate 43 between them.

An FPC (flexible printed circuit: flexible substrate) 48 for taking in an electric signal from a gap provided between the lens holder 45 and the heat sink 46 is connected to the substrate 43. And a datum pin 49 to be used as a datum point for alignment of a photosensitive drum 50 at the time of assembling an optical write head in an electro-photographic printer is provided at an end portion in the longitudinal direction of the lens holder 45. This photosensitive drum 50 is provided above the resin lens array 10.

Figure 15:
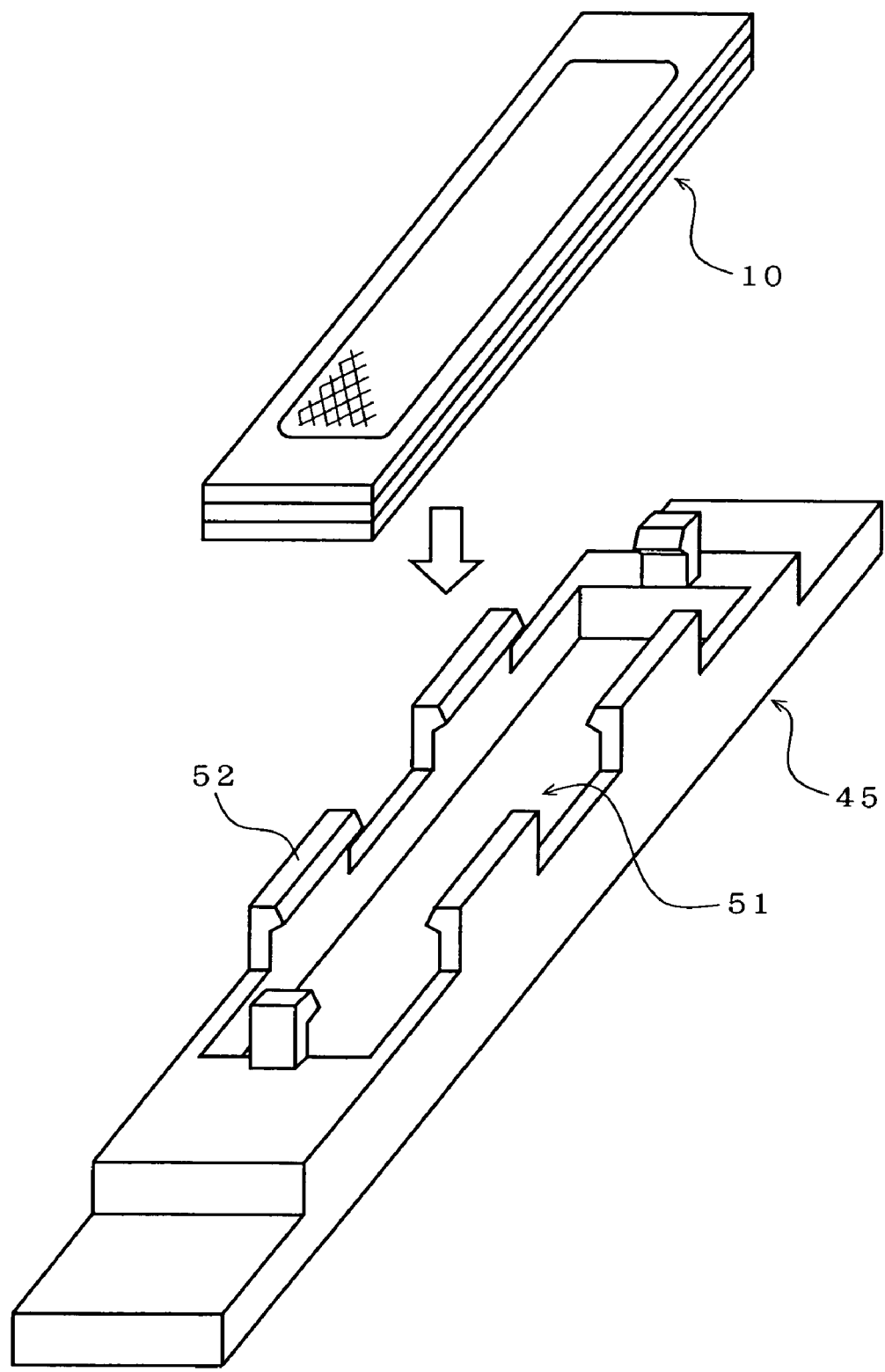
FIG. 15 is a perspective view of a lens holder and a resin lens array.

FIG. 15 is a perspective view of the lens holder and the resin lens array shown in FIG. 14. As shown in FIG. 15, an opening 51 having a shape capable of housing the resin lens array 10 is formed in the middle of the lens holder 45, and engaging portions 52 each having a projection at the opening 51 side are provided at regular intervals over the whole range of the longitudinal direction side of the opening 51 and the perpendicular direction side to the longitudinal direction of the opening 51 around the opening 51.

The engaging portions 52 are molded out of resin into one body together with the lens holder 45. The resin lens array 10 is supported in the lens holder 45 by inserting the resin lens array 10 into the opening 51 from above and pressing the end portions of the resin lens array 10 against the projections of the engaging portions 52.

In the above-mentioned embodiment, the engaging portions 52 are provided at both of the longitudinal direction sides and the perpendicular direction sides to the longitudinal direction of the opening 51 around the opening 51, but may be provided at only the longitudinal direction sides or only the perpendicular direction sides to the longitudinal direction. And the engaging portions may be provided continuously or successively at regular intervals at the longitudinal direction sides and/or the perpendicular direction sides to the longitudinal direction. Further, they may be provided not only at regular intervals but also at irregular intervals.

In an optical write head of the present invention, since a lens holder has engaging portions for engaging a resin lens array around an opening as described above, the resin lens array can be easily mounted only by lightly pressing down the resin lens array into the lens holder. Therefore, it is possible to greatly shorten a time for assembling the resin lens array in the lens holder and reduce the cost of production.

FIG. 16 is a sectional view of an end portion in the longitudinal direction of the lens holder and the resin lens array taken along the longitudinal direction of them. FIG. 16 shows a state when an optical write head is subjected to a temperature change.

When a lens holder 45 provided with the above-mentioned engaging portions 52, said lens holder mounted with a resin lens array 10, is subjected to a temperature change, the difference in length caused by the difference in coefficient of thermal expansion between the lens holder 45 and the resin lens array 10 occurs, but the engaging portions 52 formed out of a material capable of absorbing the difference in displacement caused by the difference in coefficient of thermal expansion can absorb the difference in displacement thanks to a fact that the engaging portions 52 change in shape as shown in dashed lines of FIG. 16. At this time, since the distance L0 between the light-emitting element array chips 44 mounted on the substrate 43 and the resin lens array 10 is not changed, the deterioration in printing quality can be prevented.

In an optical write head of the present invention, since a resin lens array is not fixed to a datum plane of a lens holder, even if the difference in displacement caused by the difference in coefficient of thermal expansion occurs between the lens holder and the resin lens array due to a temperature change, it is possible to absorb the difference in displacement with the variation in position of the engaging portions and prevent the lens holder and the resin lens array from warping or the resin lens array from being broken.

And since a load F pressing down the resin lens array to the lens holder side (toward the light-emitting elements) is applied to the resin lens array by inclined portions 52a provided on the engaging portions 52, there is no variation in position in the focal distance direction between the light-emitting elements and the lens array and thus the optical performance is not changed. Therefore, the deterioration in printing quality can be prevented.

It is preferable to make the inclined portion 52a into an inclined face as shown in FIG. 16. And when the engaging portion 52 is provided so as to extend long in the direction of a normal line to the resin lens array 10, since the distance from the fulcrum to the point of action is lengthened, a load to displacement of the engaging portion 52 can be made small.

FIG. 17 is a sectional view taken along line B–B' of FIG. 14. FIG. 17 shows a state of applying a sealing material 53 between the resin lens array 10 and the lens holder 45 in order to prevent the deterioration in performance due to invasion of foreign matter such as toner or the like into a head.

In a place where no engaging portion 52 is provided, a gap appears between the resin lens array 10 and the lens holder 45, but the invasion of foreign matter such as toner or the like into the head can be prevented by applying a sealing material 53 such as caulking silicone or the like thereto.

Since the resin lens array 10 is fixed to the lens holder 45 by the engaging portions 52, the sealing material 53 can be applied without necessity of a jig or the like for fixing the resin lens array 10 to the lens holder 45 and therefore the operability is improved.

In an optical write head of the present invention, since engaging portions are provided on the area of a lens holder to be mounted with a resin lens array, it is possible to easily fix the resin lens array to the lens holder and fix the resin lens array to the lens holder without necessity of a jig. Further, also when applying a sealing material to an end portion of the resin lens array, since it is not necessary to fix both of them together by means of a jig, a head can be easily manufactured.

In the above-mentioned embodiments, a lens holder formed out of resin has been described, but without limiting to resin, metal materials and the like which are capable of absorbing the difference in displacement caused by the difference in coefficient of thermal expansion can be also used. And the other parts than engaging portions may be formed out of resin and only the engaging portions may be formed out of metal or springs.

And in the above-mentioned embodiments, a self-scanning light-emitting element array chip can be used as a light-emitting element array chip. A self-scanning light-emitting element array chip is a light emitting array chip having a self-scanning circuit built in it and a function of transferring a light emitting point in order.

With regard to a self-scanning light-emitting element array, Japanese Patent Laid-Open Publication No.Hei 1-238, 962, Japanese Patent Laid-Open Publication No.Hei 2-14, 584, Japanese Patent Laid-Open Publication No.Hei 2-92, 650, Japanese Patent Laid-Open Publication No.Hei 2-92, 651 and the like have disclosed that it makes a mounting process simple as a light source for a printer head, that it can make small the interval between light-emitting elements, that it enables a compact printing head to be manufactured, and the like. And Japanese Patent Laid-Open Publication No.Hei 2-263, 668 has proposed a self-scanning light-emitting element array having a structure in which a transferring element array is separated as a shift part from a light-emitting element array which is a light emitting part.

Figure 18:
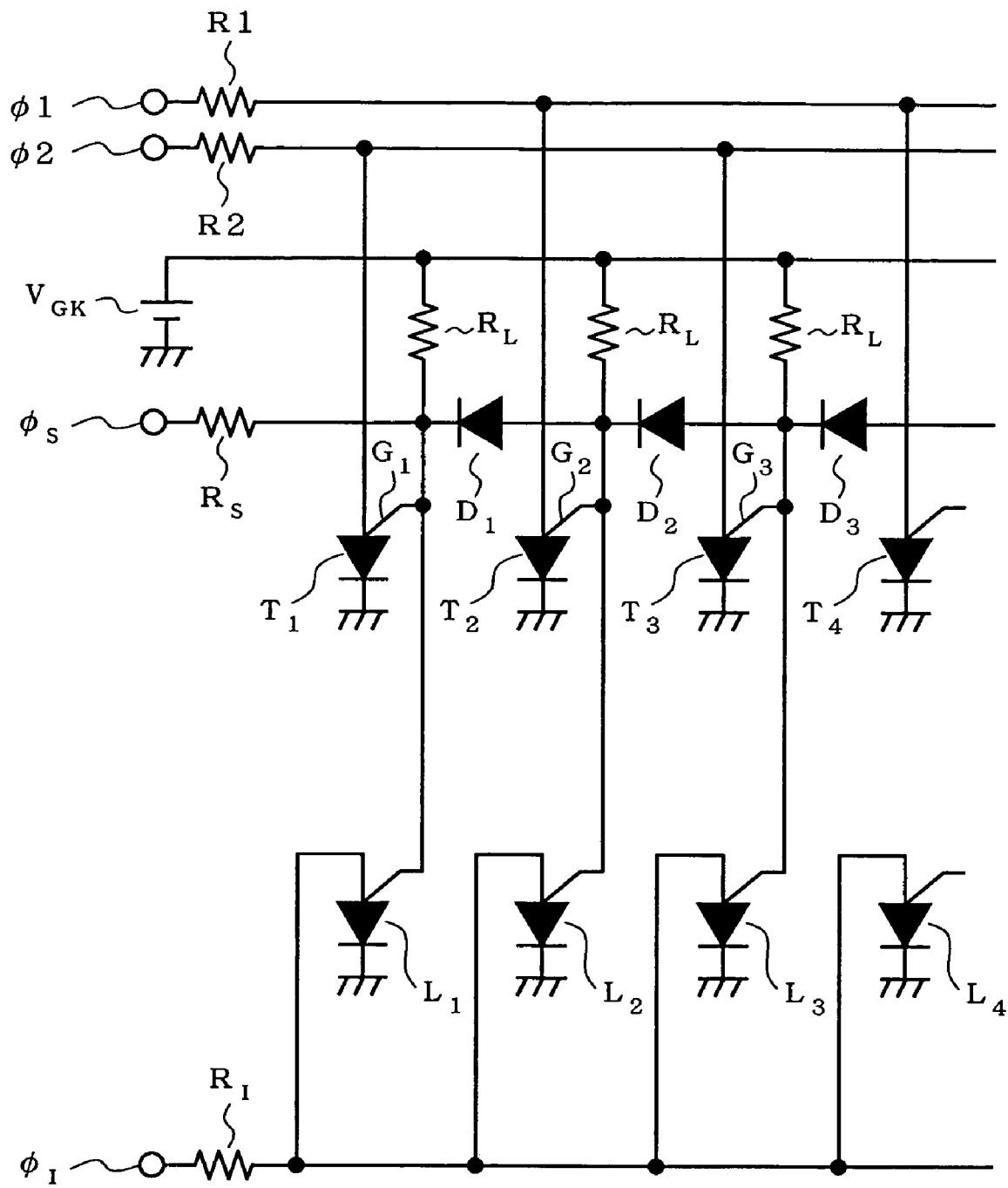
FIG. 18 is a diagram showing an equivalent circuit of a self-scanning light-emitting element array.

FIG. 18 shows an equivalent circuit of a self-scanning light-emitting element array having a structure in which a shift part and a light emitting part are separated from each other. The shift part has transfer elements $T_1$, $T_2$, $T_3$ and so forth, and the light emitting part has write light-emitting elements $L_1$, $L_2$, $L_3$ and so forth. The transfer element and light-emitting element each are composed of a three-terminal light emitting thyristor. The shift part uses diodes $D_1$, $D_2$, $D_3$ and so forth in order to connect the gates of transfer elements to each other electrically. $V_{GK}$ is a power source (ordinarily 5 volts) and is connected through load resistors $R_L$ to gate electrodes $G_1$, $G_2$, $G_3$ and so forth of the respective transfer elements. And the gate electrodes $G_1$, $G_2$, $G_3$ and so forth of the transfer elements are connected also to the gate electrodes of the write light-emitting elements. A start pulse $\phi_S$ is applied to the gate electrode of the transfer element $T_1$, and transfer clock pulses $\phi 1$ and $\phi 2$ are alternately applied to the anode electrodes of the transfer elements and a write signal $\phi_I$ is applied to the anode electrodes of the write light-emitting elements.

In the figure, R1, R2, $R_S$ and $R_I$ respectively show current limiting resistors.

The operation is briefly described. First, it is assumed that the voltage of a transfer clock pulse $\phi 1$ is an H level and the transfer element $T_2$ is on. At this time, the potential of the gate electrode $G_2$ drops from 5 volts of $V_{GK}$ to nearly zero volts. The influence of this potential drop is transferred to the gate electrode $G_3$ by the diode $D_2$ and sets its potential at about 1 volt (the forward threshold voltage of the diode $D_2$ (equal to the diffusion potential)). However, since the diode $D_1$ is inversely biased, the potential connection to the gate electrode $G_1$ is not performed and the potential of the gate electrode $G_1$ remains as 5 volts. Since the on-state voltage of a light emitting thyristor is approximated to a gate electrode potential+the diffusion potential of a pn junction (about 1 volt), if the voltage of H level of the next transfer clock pulse $\phi 2$ is set between about 2 volts (voltage necessary for turning on the transfer element $T_3$) and about 4 volts (voltage necessary for turning on the transfer element $T_5$), only the transfer element $T_3$ can be turned on and the other transfer elements can be left as off state. Therefore, the on state is transferred by two transfer clock pulses.

The start pulse $\phi_S$ is a pulse for starting such a transfer operation and the transfer element $T_1$ is turned on by setting the start pulse $\phi_S$ at H level (about 0 volt) and at the same time setting a transfer clock pulse $\phi 2$ at H level (about 2 to about 4 volts). Immediately after this, the start pulse $\phi_S$ is returned to H level.

Now, assuming that the transfer element $T_2$ is on, the potential of the gate electrode $G_2$ is about 0 volt. Therefore, if the voltage of a write signal $\phi_I$ is not lower than the diffusion potential (about 1 volt) of a pn junction, the light-emitting element $L_2$ can be made to come into a light emitting state.

On the other hand, the gate electrode $G_1$ is about 5 volts and the gate electrode $G_3$ becomes about 1 volt. Accordingly, the write voltage of the light-emitting element $L_1$ becomes about 6 volts and the write voltage of the light-emitting element $L_3$ becomes about 2 volts. From this, the voltage of a write signal $\phi_I$ capable of writing into only the light-emitting element $L_2$ comes to be in the range of 1 to 2 volts. When the light-emitting element $L_2$ is turned on, namely, comes into a light emitting state, the intensity of emitted light is determined by the quantity of electric current flowing through a write signal $\phi_I$ and an image can be written at an optional intensity. And in order to transfer a light emitting state to the next light-emitting element, it is necessary to lower the voltage of a write signal $\phi_I$ line to 0 volt once and turn off the light-emitting element which is in a light emitting state.

INDUSTRIAL APPLICABILITY

The present invention enables a high-accuracy alignment without increasing the number of components in assembling a resin lens array by providing projections and depressions for alignment on resin lens plates forming the resin lens array and fitting the projections and the depressions to each other.

And since the present invention can suppress the attenuation in quantity of light by providing an AR coat film on a resin lens plate forming a resin lens array, the present invention makes it possible to obtain an optical write head having a large quantity of light.

And since the present invention has a structure in which the shape of a fitting depression of a lens holder having a resin lens array placed in it is longer than the resin lens array in the longitudinal direction so as to be capable of absorbing a strain caused by the difference in coefficient of thermal expansion between both the components, it is possible to prevent a stress from occurring between both the components even when the ambient temperature changes.

And by providing a transparent cover over the optical output surface of a resin lens array, the present invention can make a cleaning operation simple thanks to being capable of flattening an optical output surface and can prevent the resin lens array from being scratched at the time of performing a cleaning operation thanks to being protected by the transparent cover.

Further, since the present invention places a resin lens array in a lens holder having a flat supporting seat surface and always presses down the resin lens array against the lens holder by means of a metal retainer, the shape of the resin lens array is preserved.

And since the present invention makes it possible to easily mount a resin lens array in a lens holder by means of engaging portions provided on the lens holder, the process of production is made simple and the cost of production can be reduced.

Furthermore, since the present invention can absorb a strain caused by the thermal expansion of a resin lens array by means of engaging portions provided on a lens holder and keep constant the distance between the resin lens array and a light-emitting element array chip, it makes high-quality printing possible.

The invention claimed is:

1. A resin lens array being formed by stacking one over another a plurality of resin lens plates each having spherical or aspherical microlenses regularly arranged at specific intervals on a flat plate, wherein:

each of the plurality of resin lens plates has cone-shaped projections formed at specific intervals outside the area in which lenses are formed on one surface and depressions formed outside the area in which lenses are formed on the other surface, and the plurality of resin lens plates are stacked so that said depressions are fitted to said projections.

2. A resin lens array according to claim 1, wherein at least one hole for making an adhesive agent escape when said projection and said depression are made to adhere and fix to each other is formed in said depression to be fitted to said projection.

3. A resin lens array being formed by stacking one over another a plurality of resin lens plates each having spherical or aspherical microlenses regularly arranged at specific intervals on a flat plate, wherein:

each of the plurality of resin lens plates has projections formed outside the area in which lenses are formed on one surface and depressions formed outside the area in which lenses are formed on the other surface, the projections being triangle-shaped in cross section and continuous or being triangle-shaped in cross section and successive at specific intervals, and the plurality of resin lens plates are stacked so that said depressions are fitted to said projections.

4. A resin lens array according to claim 3, wherein at least one groove for making an adhesive agent escape when said projection and said depression are made to adhere and fix to each other is formed in said depression to be fitted to said projection.

5. A resin lens array according to one of claims 1 to 4, wherein said resin lens plate has said microlenses arranged regularly at specific intervals on both surfaces or one surface of it and said resin lens array is formed by stacking said resin lens plates one over another so as to have at least three or more lens forming surfaces.

6. A resin lens array according to one of claims 1 to 4, wherein an antireflection coating for reducing the reflection of light is formed on the surface of said resin lens plate.

7. An optical write head collecting and projecting light outputted from light-emitting element array chip having light-emitting elements arranged in line on a photosensitive member through a resin lens array formed by stacking one over another as, plurality of resin lens plates each having spherical or aspherical microlenses regularly arranged at specific intervals on a flat plate, wherein;

each of the plurality of resin lens plates has projections formed outside the area in which lenses are formed on one surface and depressions formed outside the area in which lenses are formed on the other surface, the plurality of resin lens plates are stacked so that said depressions are fitted to said projections, and said projections are cone-shaped projections provided at specific intervals.

8. An optical write head according to claim 7, wherein at least one hole for making an adhesive agent escape when said projection and said depression are made to adhere and fix to each other is formed in said depression to be fitted to said projection.

9. An optical write head collecting and projecting light outputted from a light-emitting element array chip having light-emitting elements arranged in line on a photosensitive member through resin lens array formed by stacking one over another a plurality of resin lens plates each having spherical or aspherical microlenses regularly arranged at specific intervals on a flat plate, wherein:

each of the plurality of resin lens plates has protections formed outside the area in which lenses are formed on one surface and depressions formed outside the area in which lenses are formed on the other surface.

the plurality of resin lens plates are stacked so that said depressions are fitted to said projections, and said projections are projections being triangle-shaped in cross section and continuous or successive at specific intervals.

10. An optical write head according to claim 9, wherein at least one groove for making an adhesive agent escape when said projection and said depression are made to adhere and fix to each other is formed in said depression to be fitted to said projection.

11. An optical write head according to one of claims 7 to 10, wherein said resin lens array is formed by closely stacking one over another said resin lens plates each having microlenses regularly arranged at specific intervals on both surfaces or one surface of it on a flat plate so as to have at least three or more lens forming surfaces.

12. An optical write head according to one of claims 7 to 10, wherein an antireflection coating for reducing the reflection of light is formed on the surface of said resin lens plate.

13. An optical write head according to one of claims 7 to 10, wherein a transparent cover is arranged over the output surface of said resin lens array and a metal retainer is attached to said transparent cover so that a pressing pressure is always applied to said resin lens array.

14. An optical write head according to one of claims 7 to 10, wherein said resin lens array is placed in a fitting depression formed in a supporting means for supporting said resin lens array and the length of said fitting depression in the longitudinal direction is longer than said resin lens array in the longitudinal direction so as to be capable of absorbing a strain caused by a difference in coefficient of thermal expansion in case that the strain caused by the difference in coefficient of thermal expansion occurs between said resin lens array and said supporting means.

15. An optical write head according to one of claims 7 to 10, wherein said resin lens array is housed in an opening formed in a supporting means for supporting said resin lens array and is supported in said supporting means by engaging portions provided around said opening and having projections at the opening side.

16. An optical write head according to claim 15, wherein said engaging portions are formed at the longitudinal direction side and/or the perpendicular direction side to the longitudinal direction of said opening.

17. An optical write head according to claim 16, wherein said engaging portions are formed at regular intervals or irregular intervals.

18. An optical write head according to claim 16, wherein said engaging portions are formed continuously or successively at regular intervals.

19. An optical write head according to claim 15, wherein said engaging portions are molded into one body with said supporting means.

20. An optical write head according to claim 15, wherein said engaging portions are formed out of a material capable of absorbing the difference in displacement caused by the difference in coefficient of thermal expansion between said supporting means and said resin lens array.

21. An optical write head according to claim 15, wherein a sealing material is applied between said supporting means and said resin lens array.

22. An optical write head collecting and projecting light outputted from a light-emitting element array chip having light-emitting elements arranged in line on a photosensitive member through a resin lens array formed by stacking one over another a plurality of resin lens plates each having spherical or aspherical microlenses regularly arranged at specific intervals on a flat plate, wherein:

said resin lens array is housed in an opening formed in a supporting means for supporting said resin lens array and is supported in said supporting means by engaging portions having projections at the opening side.

23. An optical write head according to claim 22, wherein said engaging portions are formed at the longitudinal direction side and/or the perpendicular direction side to the longitudinal direction of said opening.

24. An optical write head according to claim 23, wherein said engaging portions are formed at regular intervals or irregular intervals.

25. An optical write head according to claim 23, wherein said engaging portions are formed continuously or successively at regular intervals.

26. An optical write head according to one of claims 22 to 25, wherein said engaging portions are molded into one body with said supporting means.

27. An optical write head according to one of claims 22 to 25, wherein said engaging portions are formed out of a material capable of absorbing a difference in displacement caused by a difference in coefficient of thermal expansion between said supporting means and said resin lens array.

28. An optical write head according to one of claims 22 to 25, wherein a sealing material is applied between said supporting means and said resin lens array.

29. An optical write head according to one of claims 7 to 10 and 22 to 25, wherein said light-emitting element array chip is a self-scanning light-emitting element array chip.

* * * * *